US012652137B2

(12) United States Patent
Liu et al.

(10) Patent No.: US 12,652,137 B2
(45) Date of Patent: Jun. 9, 2026

(54) GROUP BASED BEAM REPORTING FOR MULTI-TRP DL TRANSMISSION WITH L1-RSRP MEASUREMENT

(71) Applicant: LENOVO (BEIJING) LIMITED, Beijing (CN)

(72) Inventors: Bingchao Liu, Beijing (CN); Chenxi Zhu, Fairfax, VA (US); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 533 days.

(21) Appl. No.: 18/017,505

(22) PCT Filed: Jul. 22, 2020

(86) PCT No.: PCT/CN2020/103497
§ 371 (c)(1),
(2) Date: Jan. 23, 2023

(87) PCT Pub. No.: WO2022/016415
PCT Pub. Date: Jan. 27, 2022

(65) Prior Publication Data
US 2023/0283426 A1      Sep. 7, 2023

(51) Int. Cl.
*H04L 25/02*      (2006.01)
*H04L 5/00*      (2006.01)

(52) U.S. Cl.
CPC ............ *H04L 5/005* (2013.01); *H04L 5/0035* (2013.01); *H04L 5/006* (2013.01)

(58) Field of Classification Search
CPC .... H04B 7/022; H04B 7/0617; H04B 7/0623; H04B 7/0626; H04B 7/0641; H04L 5/0035; H04L 5/005; H04L 5/0057; H04L 5/006
See application file for complete search history.

(56) References Cited

U.S. PATENT DOCUMENTS

2012/0302227 A1 * 11/2012 Kreuzer ............ H04W 36/0085
455/422.1
2019/0089442 A1 * 3/2019 Akoum ............... H04L 25/0224
(Continued)

FOREIGN PATENT DOCUMENTS

CN 110089044 A 8/2019
EP 4572366 A1 * 6/2025 ............ H04W 16/28
(Continued)

OTHER PUBLICATIONS

OPPO, "Remaining Issues on Multi-beam Operation Enhancement", 3GPP TSG RAN WG1 #100 R1-2000458, Feb. 24-Mar. 6, 2020, pp. 1-8.
(Continued)

*Primary Examiner* — Phuc H Tran
(74) *Attorney, Agent, or Firm* — Kunzler Needham & Hilton

(57) ABSTRACT
Methods and apparatuses for group-based beam reporting with L1-RSRP measurement for multi-TRP DL transmission are disclosed. In one embodiment, a method comprises receiving a CSI reporting setting linked to two Resource Settings for channel measurement for group based beam reporting, and transmitting a CSI report corresponding to the CSI reporting setting, wherein the CSI report includes two or more CRIs or SSBRIs and their corresponding received powers.

18 Claims, 3 Drawing Sheets

(56) References Cited

U.S. PATENT DOCUMENTS

| | | | | |
|---|---|---|---|---|
| 2019/0190582 A1* | 6/2019 | Guo | .................. | H04L 1/0061 |
| 2023/0189344 A1* | 6/2023 | Su | ................. | H04L 5/0051 |
| | | | | 370/329 |

FOREIGN PATENT DOCUMENTS

| | | | | |
|---|---|---|---|---|
| WO | WO-2021155745 A1 * | 8/2021 | ......... | H04B 17/318 |
| WO | WO-2021161451 A1 * | 8/2021 | ......... | H04B 7/0626 |

OTHER PUBLICATIONS

International Searching Authority, "Written Opinion of the International Searching Authority," PCT/CN2020/103497, Apr. 15, 2021, pp. 1-3.
Lenovo, Motorola Mobility, Discussion on enhancements for multi-beam operation, 3GPP TSG RAN WG1 Meeting #94b, R1-1810572, Oct. 10-12, 2018, pp. 1-4, Chengdu, China.
Vivo, Further discussion on Multi-Beam Operation, 3GPP TSG RAN WG1 #97, R1-1906160, May 13-17, 2019, pp. 1-9, Reno, USA.

* cited by examiner

GROUP BASED BEAM REPORTING FOR MULTI-TRP DL TRANSMISSION WITH L1-RSRP MEASUREMENT

FIELD

The subject matter disclosed herein generally relates to wireless communications, and more particularly relates to methods and apparatuses for group-based beam reporting with L1-RSRP measurement for multi-TRP DL transmission.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Downlink control information (DCI), Single-DCI (S-DCI), transmission reception point (TRP), multiple TRP (multi-TRP or M-TRP), Quasi Co-Location (QCL), channel state information (CSI), channel state information reference signal (CSI-RS), Transmission Configuration Indication (TCI), reference signal (RS), Media Access Control (MAC), Control Element (CE), Demodulation Reference Signal (DM-RS), non-coherent joint transmission (NCJT), frequency range (FR), CSI-RS resource indicator (CRI), Non-Zero Power (NZP), Information Element (IE), Reference Signal Received Power (RSRP), Layer 1 RSRP (L1-RSRP), primary synchronization signal (PSS), secondary synchronization signal (SSS), physical broadcast channel (PBCH), synchronization signal block (SSB), SSB resource indicator (SSBRI).

In NR Release 15, a CSI reporting setting configured by higher layer parameter 'CSI-ReportConfig' is linked to one Resource Setting for channel measurement which may have multiple CSI-RS resource sets each of which may include one or more CSI-RS resources. One or more CSI-RS resource sets selected from the Resource Setting are linked with one 'CSI-ReportConfig'. From the UE point of view, the CSI-RS resources included in the linked CSI-RS resource set(s) are to be received by the UE for the channel measurement.

A higher layer parameter 'reportQuantity' contained in 'CSI-ReportConfig' IE configures the UE with the CSI quantities (parameters) to be reported. The parameters may include but not limited to CSI-RS resource indicator (CRI) and layer 1 Reference Signal Received Power (L1-RSRP) (e.g. when 'reportQuantity' is set to 'cri-RSRP').

CRI is used to indicate a CSI-RS resource to derive the corresponding CSI parameter(s) (e.g. L1-RSRP). That is, each CRI is used to indicate one CSI-RS resource from the CSI-RS resources included in the linked CSI-RS resource set(s) in the Resource Setting, based on which a L1-RSRP is measured.

L1-RSRP for CSI-RS is defined as the linear average over the power contributions (in [W]) of the resource elements of the antenna port(s) that carry CSI-RSs configured for RSRP measurements within the considered measurement frequency bandwidth in the configured CSI-RS occasions. In other words, one L1-RSRP represents the received power of one CSI-RS resource indicated by a CRI. The one L1-RSRP can be said to correspond to the CRI.

In addition to being based on CSI-RS resource, L1-RSRP can be measured based on SSB (SS/PBCH block) resource. Each SS/PBCH block, from which UE can obtain the system information, contains a PSS (primary synchronization signal), SSS (secondary synchronization signal), and PBCH (physical broadcast channel) where each of them is transmitted by the gNB using a same spatial Tx beam. The PSS, SSS and PBCH together are referred to as synchronization signal block (SSB). When the 'report Quantity' contained in 'CSI-ReportConfig' IE is set to 'ssb-Index-RSRP', the 'CSI-ReportConfig' is linked to one Resource Setting for channel measurement which may have multiple SSB resource sets each of which may include one or more SSB resources. One or more SSB resource sets selected from the Resource Setting are linked with one 'CSI-ReportConfig'. From the UE point of view, the SSB resources included in the linked SSB resource set(s) are to be received by the UE for the channel measurement. SSBRI is used to indicate a SS/PBCH block resource (may be referred to as "SSB resource") to derive the corresponding CSI parameter(s) (e.g. L1-RSRP). That is, each SSBRI is used to indicate one SSB resource from the SSB resources included in the linked SSB resource set(s) in the Resource Setting, based on which a L1-RSRP is measured. L1-RSRP for SSB is defined as the linear average over the power contributions (in [W]) of the resource elements that carry secondary synchronization signals. One L1-RSRP represents the received power of one SSB resource indicated by a SSBRI. The one L1-RSRP can be said to correspond to the SSBRI.

As a whole, when a 'CSI-ReportConfig' is linked to one Resource Setting for channel measurement, and the 'report Quantity' is set to 'cri-RSRP' or 'ssb-Index-RSRP', the UE would report CRI or SSBRI and L1-RSRP measured based on the CSI-RS or SSB resource indicated by the CRI or SSBRI (may be referred to as "L1-RSRP corresponding to the CRI or SSBRI"). In particular, a measured L1-RSRP is a received power of the CSI-RS or SSB resource indicated by the CRI or SSBRI.

Group based beam reporting is supported in NR Release 15 for L1-RSRP based beam measurement, e.g. by setting 'reportQuantity' to 'cri-RSRP' or 'ssb-Index-RSRP' and configuring the UE with a higher layer parameter 'groupBasedBeamReporting' set to 'enabled'. When 'groupBasedBeamReporting' is set to 'enabled', the UE shall report, in a single CSI report, two different CRIs (or SSBRIs) along with corresponding L1-RSRPs, where the two CSI-RS resources (or SSB resources) indicated by the two different CRIs (or SSBRIs) can be received simultaneously by the UE either with a single spatial domain receive filter, or with multiple simultaneous spatial domain receive filters.

Table 0 gives an example of a CSI report, in which 'report Quantity' is set to 'cri-RSRP' or 'ssb-Index-RSRP'; and 'groupBasedBeamReporting' is set to 'enabled'.

TABLE 0

| CSI | RSRP |
|---|---|
| CRI or SSBRI #1 | RSRP #1 |
| CRI or SSBRI #2 | Differential RSRP #2 |

It is assumed that RSRP #1 is larger than RSRP #2. Therefore, RSRP #1 is quantized to a 7-bit value in the range [−140, −44] dBm with 1 dB step size. On the other hand, RSRP #2 is reported by a differential value. That is, a differential value 'differential RSRP #2' obtained by RSRP #1–RSRP #2 is reported. The 'differential RSRP #2' is computed with 2 dB step size with a reference to the largest measured L1-RSRP value (i.e. RSRP #1). The differential RSRP #2 is quantized to a 4-bit value. As a 4-bit value can only indicate 16 different values, the RSRP represented by a differential RSRP is at most 32 dB (=2 dB*16) lower than the largest measured L1-RSRP value. It implies that a CRI or SSBRI indicating a CSI-RS or SSB resource based on which a L1-RSRP is measured will not be reported, if the L1-RSRP is more than 32 dB lower than the largest measured L1-RSRP. The CSI report in which at least one RSRP is reported by differential RSRP is referred to as differential L1-RSRP based reporting.

In NR Release 15 and NR Release 16, the CSI feedback framework is designed for single-TRP scenario. That is, all of reported CRIs or SSBRIs indicate CSI-RS or SSB resources transmitted from one TRP.

Single-DCI based multi-TRP DL transmission and multi-DCI based multi-TRP DL transmission are supported in NR Release 16.

Single-DCI based multi-TRP DL transmission is used for the scenario that two TRPs (e.g. TRP0 and TRP1) serve one UE with ideal backhaul. In any slot, any one of the two TRPs (TRP0 or TRP1) may transmit a DCI scheduling a PDSCH transmission transmitted from two TRPs (TRP0 and TRP1) where partial layer(s) of the PDSCH transmission are transmitted by one TRP (e.g. TRP0) and other layers of the PDSCH transmission are transmitted by the other TRP (e.g. TRP1). It means that a UE may receive a PDSCH transmission transmitted from two TRPs by using two different TCI states indicated by the 'Transmission Configuration Indication' (TCI) field in the triggering DCI.

Multi-DCI based multi-TRP DL transmission can be used for the scenario that two TRPs (e.g. TRP0 and TRP1) serve one UE with non-ideal backhaul. In any slot, any one TRP (TRP0 or TRP1) may transmit a DCI scheduling a PDSCH transmission transmitted by any one TRP (TRP0 or TRP1). The TCI field in the DCI points to a single TCI state for the PDSCH reception scheduled by the DCI. It means that in one slot, the UE may receive two DCIs transmitted by two TRPs and may receive two PDSCH transmissions simultaneously, each of which is transmitted by a separate TRP (TRP0 or TRP1). A higher layer parameter CORESET-PoolIndex can be configured for each CORESET, which identifies a set of time-frequency resources for PDCCH transmission, for TRP identification.

Group based beam reporting can be used in both single-DCI based multi-TRP DL transmission and multi-DCI based multi-TRP DL transmission, but need to enhanced in multi-TRP (e.g. two TRPs) scenario.

For group based beam reporting of NR Release 16, only a pair of CRIs (or SSBRIs) along with their RSRPs can be reported in a single report. It is not sure whether the CSI-RS or SSB resources indicated by the pair of CRIs (or SSBRIs) are transmitted from different TRPs. Even if it is assumed that two CSI-RS or SSB resources indicated by the pair of CRIs (or SSBRIs) are transmitted from two TRPs, respectively, it is not sufficient to only report one pair of CRIs (or SSBRIs) in the scenario of single-DCI based multi-TRP DL transmission.

For multi-DCI based multi-TRP PDCH transmission, two TRPs may schedule two PDSCH transmissions in a same slot using overlapped time-frequency resources with any possible TCI state combinations selected from two different TCI state sets associated with different TRPs. NR Release 16 group based beam reporting may be inefficient for this scenario, because all reported CRI or SSBRI pairs for different 'CSI-ReportConfig's are independent.

This invention discloses methods and apparatuses for reporting CSI in scenarios of multi-TRP based DL transmission.

BRIEF SUMMARY

Methods and apparatuses for group-based beam reporting with L1-RSRP measurement for multi-TRP DL transmission are disclosed.

In one embodiment, a method comprises receiving a CSI reporting setting linked to two Resource Settings for channel measurement for group based beam reporting, and transmitting a CSI report corresponding to the CSI reporting setting, wherein the CSI report includes two or more CRIs or SSBRIs and their corresponding received powers.

In one embodiment, the CSI report includes N pair(s) of CRIs or SSBRIs and their corresponding received powers, N is configured by RRC signaling and is a positive integer, the CSI-RS or SSB resources indicated by CRIs or SSBRIs in each pair can be received simultaneously by UE. The CSI-RS or SSB resource indicated by one CRI or SSBRI in each pair is selected from a first Resource Setting, and the CSI-RS or SSB resource indicated by the other CRI or SSBRI in the each pair is selected from a second Resource Setting. The received power may be included in the CSI report as RSRP or differential RSRP. In a first implementation, the received power with the largest value among received powers based on the CSI-RS or SSBRI resources in the first Resource Setting is included in the CSI report as RSRP, and other received power(s) are included in the CSI report as differential RSRP(s), wherein one bit of the representation of the differential RSRP indicates whether the differential RSRP is positive or negative. In a second implementation, the received power with the largest value among received powers based on the CSI-RS or SSBRI resources in both the first Resource Setting and the second Resource Setting is included in the CSI report as RSRP, and the CSI report includes an extra one-bit indication indicating the RSRP is based on a CSI-RS or SSBRI resource in the first Resource Setting or in the second Resource Setting, and other received power(s) are included in the CSI report as differential RSRP(s). In a third implementation, all of the received powers based on the CSI-RS or SSBRI resources in the first Resource Setting are included in the CSI report as RSRPs, and all of the received powers based on the CSI-RS or SSBRI resources in the second Resource Setting are included in the CSI report as differential RSRPs, and one bit of the representation of the differential RSRP indicates whether the differential RSRP is positive or negative. The differential RSRP may be represented by a 5-bit value or a 6-bit value configured by RRC signaling.

In another embodiment, the CSI report includes two sets of CRIs or SSBRIs and their corresponding received powers, each set includes N CRIs or SSBRIs and their corresponding received powers, N is configured by RRC signaling and is a positive integer. The CSI-RS or SSB resource indicated by each CRI or SSBRI in one set of the two sets is selected from a first Resource Setting, and the CSI-RS or SSB resource indicated by each CRI or SSBRI in the other set of the two sets is selected from a second Resource Setting. The CSI-RS or SSB resource indicated by any CRI or SSBRI in the one set and the CSI-RS or SSB resource indicated by any CRI or SSBRI in the other set can be simultaneously received by UE. The received power with the largest value among received powers based on the CSI-RS or SSBRI resources in the one set, and the received power with the largest value among received powers based on the CSI-RS or SSBRI resources in the other set are included in the CSI report as RSRPs, and other received powers are included in the CSI report as differential RSRPs.

In another embodiment, a remote unit comprises a receiver that receives a CSI reporting setting linked to two Resource Settings for channel measurement for group based beam reporting, and a transmitter that transmits a CSI report corresponding to the CSI reporting setting, wherein the CSI report includes two or more CRIs or SSBRIs and their corresponding received powers.

In one embodiment, a method comprises transmitting a CSI reporting setting linked to two Resource Settings for channel measurement for group based beam reporting, and receiving a CSI report corresponding to the CSI reporting setting, wherein the CSI report includes two or more CRIs or SSBRIs and their corresponding received powers.

In yet another embodiment, a base unit comprises a transmitter that transmits a CSI reporting setting linked to two Resource Settings for channel measurement for group based beam reporting, and a receiver that receives a CSI report corresponding to the CSI reporting setting, wherein the CSI report includes two or more CRIs or SSBRIs and their corresponding received powers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
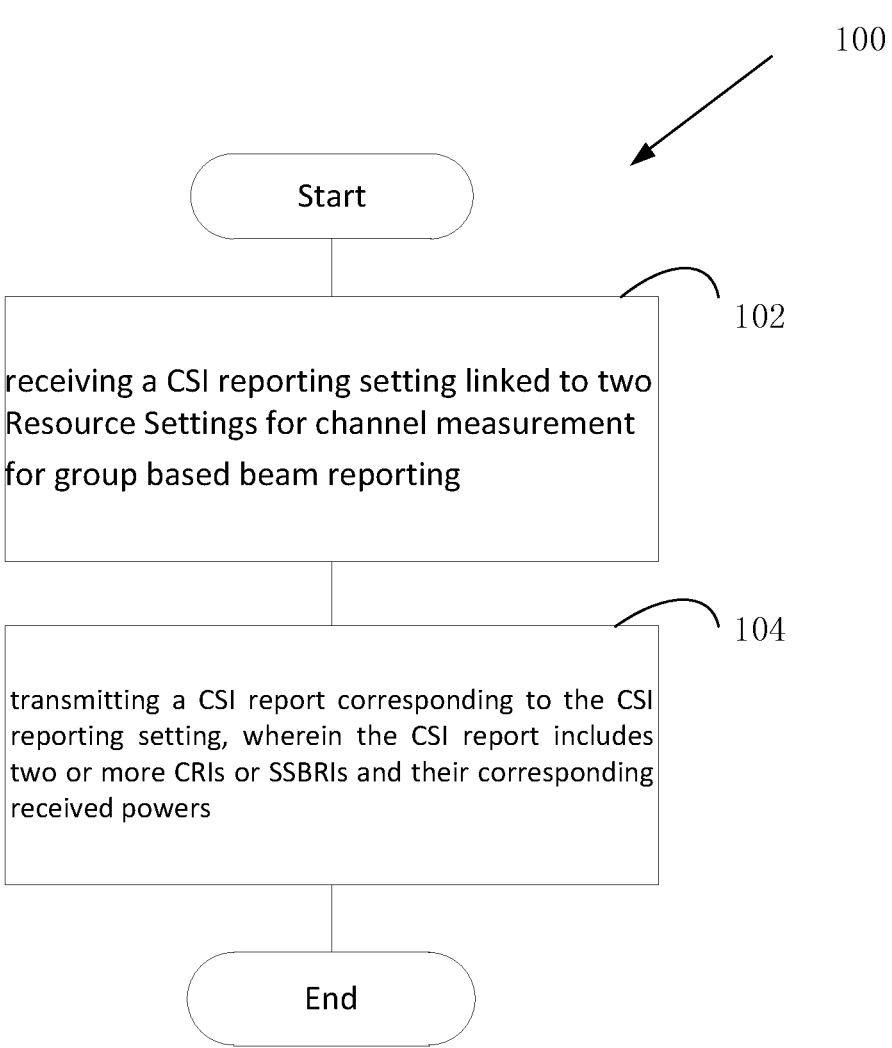
FIG. 1 is a schematic flow chart diagram illustrating an embodiment of a method.

As will be appreciated by one skilled in the art that certain aspects of the embodiments may be embodied as a system, apparatus, method, or program product.

Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In a multi-TRP (e.g. two TRPs) scenario where a UE is served by multiple TRPs, the UE may receive DL signals simultaneous from multiple TRPs with different spatial Rx parameters in FR2.

Traditionally, one 'CSI-ReportConfig' can be linked to only one Resource Setting for channel measurement that is related to one TRP. In particular, a triggering state (i.e. a non-zero CSI request field value) (suppose that the triggering state is associated with one 'CSI-ReportConfig') is associated with one or multiple CSI-RS resource sets in the one Resource Setting. In other words, one 'CSI-ReportConfig' can only be used to configure the UE to report CSI parameters for one TRP. If CSI parameters for multiple TRPs (e.g. two TRPs) are to be reported, multiple (e.g. two) different 'CSI-ReportConfig's should be triggered to the UE.

According to the present disclosure, two Resource Set-tings for channel measurement (e.g. a first Resource Setting for channel measurement (maybe abbreviated as "first Resource Setting") and a second Resource Setting for chan-nel measurement (maybe abbreviated as "second Resource Setting")) can be configured for a UE for one CSI reporting setting 'CSI-ReportConfig', where the UE has the capability of simultaneous reception with different spatial Rx param-eters in FR2. That is, one CSI reporting setting 'CSI-ReportConfig' is linked to two Resource Settings for channel measurement (i.e. first Resource Setting and second Resource Setting). Each of the first Resource Setting and the second Resource Setting has one or multiple CSI-RS resource sets (or one or multiple SSB resource sets), where each CSI-RS resource set has one or multiple CSI-RS resources (or each SSB resource set has one or multiple SSB resources).

From the UE point of view, when one CSI reporting setting 'CSI-ReportConfig' is linked with one or multiple first CSI-RS (or SSB) resource set(s) in the first Resource Setting and one or multiple CSI-RS (or SSB) second resource set(s) in the second Resource Setting, the UE would be configured with one or more CSI-RS (or SSB) resources in the first resource sets and one or more CSI-RS (or SSB) resources in the second resource set(s). For simplicity, the one or more CSI-RS (or SSB) resources in the first CSI-RS (or SSB) resource sets in the first Resource Setting linked with one CSI reporting setting 'CSI-ReportConfig' can be referred to as CSI-RS (or SSB) resources selected from the first Resource Setting while the one or more CSI-RS (or SSB) resources in the second CSI-RS (or SSB) resource sets in the second Resource Setting linked with the one CSI reporting setting 'CSI-ReportConfig' can be referred to as CSI-RS (or SSB) resources selected from the second Resource Setting. The CSI-RS (or SSB) resources selected from the first Resource Setting are transmitted from one TRP (e.g. TRP0); and the CSI-RS (or SSB) resources selected from the second Resource Setting are transmitted from the other TRP (e.g. TRP1).

For simplicity, the following embodiments are described by assuming the higher layer parameter 'report Quantity' is set to 'cri-RSRP'. In this situation, CSI-RS resources are to be received by the UE and L1-RSRPs are to be measured based on the CSI-RS resources. Accordingly, CRIs and their corresponding L1-RSRPs will be reported. Needless to say, the following embodiments also apply to the situation in which the higher layer parameter 'reportQuantity' is set to 'ssb-Index-RSRP', in which SSB resources are to be received by the UE, L1-RSRPs are to be measured based on the SSB resources, and SSBRIs and their corresponding L1-RSRPs will be reported.

In addition, in the following description, L1-RSRP is abbreviated as RSRP.

A first embodiment is related to single-DCI based multi-TRP DL transmission.

The following conditions are met for the first embodi-ment: (1) the UE is configured with a CSI reporting setting 'CSI-ReportConfig' linked to two Resource Settings (e.g. first Resource Setting and second Resource Setting); (2) the higher layer parameter 'reportQuantity' is set to 'cri-RSRP'; (3) the UE is configured with a higher layer parameter 'groupBasedBeamReporting' set to 'enabled'; and (4) A higher layer parameter nrofReportedRS-Rel-17 is config-ured to the UE. Under these conditions, a CSI report will be transmitted from the UE to the base station (e.g. gNB).

In the scenario of single-DCI based multi-TRP DL trans-mission, a PDSCH transmission transmitted from two TRPs (e.g. TRP0 and TRP1) where partial layers of the PDSCH transmission are transmitted by one TRP (e.g. TRP0) and other layers of the PDSCH transmission are transmitted by the other TRP (e.g. TRP1). The CSI-RS resources in the first Resource Setting are transmitted from one TRP (e.g. TRP0); and the CSI-RS resources in the second Resource Setting are transmitted from the other TRP (e.g. TRP1).

When the higher layer parameter 'report Quantity' is set to 'cri-RSRP', the UE should transmit a CSI report including CRI and the measured RSRP according to the CSI-RS resource indicated by the CRI. As the RSRP is measured based on the CSI-RS resource indicated by the CRI, we can say that the RSRP corresponds to the CRI.

The higher layer parameter nrofReportedRS-Rel-17 indi-cates the number of pairs of different CRIs to be contained in the CSI report. In each pair of reported CRIs, a first CRI indicates a CSI-RS resource selected from the first Resource Setting linked to the 'CSI-ReportConfig'; and a second CRI indicates a CSI-RS resource selected from the second Resource Setting linked to the 'CSI-ReportConfig'. The CSI-RS resources indicated by each pair of reported CRIs (i.e. one CSI-RS resource transmitted from one TRP (e.g. TRP0) and the other CSI-RS resource transmitted from the other TRP (e.g. TRP1)) can be received simultaneously by the UE either with a single spatial domain receive filter, or with multiple simultaneous spatial domain receive filters. The spatial domain receive filter of the UE used to receive the pair of CSI-RS resources is up to UE implementation.

The higher layer parameter nrofReportedRS-Rel-17 can be set to N (N is a positive integer). If the higher layer parameter nrofReportedRS-Rel-17 is not configured, the N can be set as a default value, e.g. 1. That is to say, the UE will measure the RSRP of each CSI-RS resource in the first Resource Setting linked to the 'CSI-ReportConfig' transmit-ted from TRP0, and measure the RSRP of each CSI-RS resource in the second Resource Setting linked to the 'CSI-ReportConfig' transmitted from TRP1. The UE will select N CSI-RS resources in the first Resource Setting linked to the 'CSI-ReportConfig' transmitted from TRP0, and N CSI-RS resources in the second Resource Setting linked to the 'CSI-ReportConfig' transmitted from TRP1, i.e. N pairs of CSI-RS resources. In each pair of N pairs of selected CSI-RS resources, a first CSI-RS resource selected from the CSI-RS resources in the first Resource Setting linked to the 'CSI-ReportConfig' transmitted from TRP0 can be received simultaneously with a second CSI-RS resources selected from the CSI-RS resources in the second Resource Setting linked to the 'CSI-ReportConfig' transmitted from TRP1. The N pairs of CSI-RS resources may be selected according to the values of the measured RSRPs, e.g., the maximum N pairs of measured RSRPs. The selected N CSI-RS resources in the first Resource Setting linked to the 'CSI-ReportConfig' transmitted from TRP0 are indicated by CRI #(0-n), n=1, 2, . . . , N; and the selected N CSI-RS resources in the second Resource Setting linked to the 'CSI-ReportConfig' transmitted from TRP1 in pair are indi-cated by CRI #(1-n), n=1, 2, . . . , N. The $n^{th}$ pair of CRI includes CRI #(0-n) and CRI #(1-n). The two CSI-RS resources indicated by CRIs in a pair can be received simultaneously by the UE. The $m^{th}$ reported CRI (m=1, 2, . . . , 2N) (i.e. each of CRI #(0-n) and CRI #(1-n), n=1, 2, . . . , N) has the value of CRI k, k=0, 1, . . . , K−1, where K is the total number of CSI-RS resources configured in the first Resource Setting (or the second Resource Setting) linked to the 'CSI-ReportConfig'. The first CRI k (k≥0) in each pair of CRIs indicates the configured (k+1)th entry of associated nzp-CSI-RS Resource in the corresponding nzp- CSI-RS-ResourceSet in the first Resource Setting for channel measurement linked to the 'CSI-ReportConfig', the second CRI k (k≥0) in each pair indicates the configured (k+1)th entry of associated nzp-CSI-RSResource in the corresponding nzp-CSI-RS-ResourceSet in the second Resource Setting for channel measurement linked to the 'CSI-ReportConfig'.

For ease of discussion, in the following examples, the value of the higher layer parameter nrofReportedRS-Rel-17 is assumed to be 4 (i.e. N=4). Needless to say, the value of the higher layer parameter nrofReportedRS-Rel-17 can be set to other positive integers than 4.

A first example of the CSI report according to the first embodiment is shown in Table 1.

TABLE 1

|  | CS | RSRP |
|---|---|---|
| 1$^{st}$ pair | CRI #0-1 | RSRP #0-1 |
|  | CRI #1-1 | Differential RSRP #1-1 |
| 2$^{nd}$ pair | CRI #0-2 | Differential RSRP #0-2 |
|  | CRI #1-2 | Differential RSRP #1-2 |
| 3$^{rd}$ pair | CRI #0-3 | Differential RSRP #0-3 |
|  | CRI #1-3 | Differential RSRP #1-3 |
| 4$^{th}$ pair | CRI #0-4 | Differential RSRP #0-4 |
|  | CRI #1-4 | Differential RSRP #1-4 |

As can be seen from Table 1, four (i.e. N=4) pairs of different CRIs and their RSRP(s) (or Differential RSRP(s)) are contained in the CSI report.

CRI #0-1 and CRI #1-1 belong to the 1$^{st}$ pair, and the CSI-RS resource indicated by CRI #0-1 and the CSI-RS resource indicated by CRI #1-1 can be received simultaneously by the UE. CRI #0-2 and CRI #1-2 belong to the 2$^{nd}$ pair, and the CSI-RS resource indicated by CRI #0-2 and the CSI-RS resource indicated by CRI #1-2 can be received simultaneously by the UE. CRI #0-3 and CRI #1-3 belong to the 3$^{rd}$ pair, and the CSI-RS resource indicated by CRI #0-3 and the CSI-RS resource indicated by CRI #1-3 can be received simultaneously by the UE. CRI #0-4 and CRI #1-4 belong to the 4$^{th}$ pair, and the CSI-RS resource indicated by CRI #0-4 and the CSI-RS resource indicated by CRI #1-4 can be received simultaneously by the UE. In short, CRI #(0-n) and CRI #(1-n) belong to the n$^{th}$ pair, and the CSI-RS resource indicated by CRI #(0-n) and the CSI-RS resource indicated by CRI #(1-n) can be received simultaneously by the UE.

All of the CSI-RS resources indicated by the first CRI of each pair (e.g. CRI #0-1, CRI #0-2, CRI #0-3, and CRI #0-4) are selected from the first Resource Setting (i.e. transmitted from one TRP (e.g. TRP0)); and all of the CSI-RS resources indicated by the second CRI of each pair (e.g. CRI #1-1, CRI #1-2, CRI #1-3, and CRI #1-4) are selected from the second Resource Setting (i.e. transmitted from the other TRP (e.g. TRP1)).

Each RSRP is measured based on the CSI-RS resource indicated by the CRI. For example, RSRP #0-1 is measured based on the CSI-RS resource indicated by CRI #0-1. It can be said that RSRP #0-1 corresponds to CRI #0-1.

The measured RSRPs can be reported by ways of differential L1-RSRP based reporting. In particular, RSRP is quantized to a 7-bit value in the range [−140, −44] dBm with 1 dB step size. Only RSRP #0-1 is represented by a 7-bit value. RSRP #0-1 is the maximum measured value among all of the measured values based on the selected CSI-RS resources in the first Resource Setting linked to the 'CSI- ReportConfig'. In the example of Table 1, RSRP #0-1 is larger than any of RSRP #0-2, RSRP #0-3, and RSRP #0-4.

The other RSRPs (e.g., RSRP #0-2 to RSRP #0-4 and RSRP #1-1 to RSRP #1-4) are reported in a differential manner. That is, "Differential RSRP #0-2" to "Differential RSRP #0-4" and "Differential RSRP #1-1" to "Differential RSRP #1-4" are contained in the CSI report. The "Differential RSRP #m" (m is between 0-2 and 0-4 and between 1-1 and 1-4) is a difference value of RSRP #m from RSRP #0-1 (e.g. "Differential RSRP #m"=RSRP #0-1-RSRP #m). A differential RSRP can be represented by a 5-bit value or a 6-bit value configured by RRC signaling.

It is obvious that "Differential RSRP #m" (m is between 0-2 and 0-4) is a positive value. On the other hand, as "RSRP #m" (m is between 1-1 and 1-4) is measured based on the CSI-RS resources in the second Resource Setting, it is not predictable whether "RSRP #m" (m is between 1-1 and 1-4) is smaller or larger than RSRP #0-1. In other words, "Differential RSRP #m" (=RSRP #0-1−RSRP #m) (m is between 1-1 and 1-4) may be either a positive value or a negative value.

In view of the above, "Differential RSRP #m" (m is between 1-1 and 1-4) may be a positive value or a negative value. Therefore, one bit of the representation of differential RSRP (i.e. one bit of the 5-bit value or 6-bit value), e.g. the most significant bit (MSB) of the differential RSRP, may be used to indicate whether the differential value is positive (e.g. by '0') or negative (e.g. by '1').

For example, if {CRI 0, CRI 3, CRI 2, CRI 6, CRI 7, CRI 8, CRI 12, CRI 10} are the values of CRI #0-1, CRI #1-1, CRI #0-2, CRI #1-2, CRI #0-3, CRI #1-3, CRI #0-4, CRI #1-4 in Table 1, in which CRI #0-1 and CRI #1-1 belong to the first pair, CRI #0-2 and CRI #1-2 belong to the second pair, CRI #0-3 and CRI #1-3 belong to the third pair, and CRI #0-4 and CRI #1-4 belong to the fourth pair. The value of CRI #0-1 is CRI 0, which represents the configured 1st (i.e. (0+1)$^{st}$) entry of associated nzp-CSI-RSResource in the corresponding nzp-CSI-RS-ResourceSet in the first Resource Setting linked to the 'CSI-ReportConfig'; the value of CRI #1-1 is CRI 3, which represents the 4$^{th}$ (i.e. (3+1)$^{th}$) entry of associated nzp-CSI-RSResource in the corresponding nzp-CSI-RS-ResourceSet in the second Resource Setting linked to the 'CSI-ReportConfig'; the value of CRI #0-2 is CRI 2, which represents the 3rd (i.e. (2+1) rd) entry of associated nzp-CSI-RSResource in the corresponding nzp-CSI-RS-ResourceSet in the first Resource Setting linked to the 'CSI-ReportConfig'; the value of CRI #1-2 is CRI 6, which represents the 7$^{th}$ (i.e. (6+1)$^{th}$) entry of associated nzp-CSI-RSResource in the corresponding nzp-CSI-RS-ResourceSet in the second Resource Setting linked to the 'CSI-ReportConfig', etc. An entry is a CSI-RS resource of a resource set in a Resource Setting (first Resource Setting or second Resource Setting) linked to the 'CSI-ReportConfig'. That is, suppose CRI 0, CRI 1, . . . , CRI K−1 are entries of selected CSI-RS resources in the first Resource Setting, and CRI 0, CRI 1, . . . , CRI K−1 are entries of selected CSI-RS resources in associated nzp-CSI-RSResource in the corresponding nzp-CSI-RS-ResourceSet in the second Resource Setting, the value of CRI #0-1 (i.e. CRI 0) represents the 1$^{st}$ entry of selected CSI-RS resources in associated nzp-CSI-RSResource in the corresponding nzp-CSI-RS-ResourceSet in the first Resource Setting, and the value of CRI #1-1 (i.e. CRI 3) represents the 4$^{th}$ entry of selected CSI-RS resources in associated nzp-CSI-RSResource in the corresponding nzp-CSI-RS-ResourceSet in the second Resource Setting.

In summary, RSRP #0-1 is quantized to a 7-bit value in the range [−440, −44] dBm with 1 dB step size. "Differential RSRP #m" (m is between 0-2 and 0-4 and between 1-1 and 1-4) is computed with 2 dB step size with a reference to the RSRP #0-1 and quantized to a 4-bit or 5-bit value in addition to 1-bit to indicate whether the differential value is positive or negative (5-bit or 6-bit in total). Traditionally (in scenario of one TRP), a differential RSRP is at most 32 dB (=2 dB*16) lower than the largest measured L1-RSRP value, which suggests that a 4-bit value is sufficient to represent a differential RSRP. In scenario of two TRPs, a differential RSRP may be larger than 32 dB. Therefore, a 5-bit value (which may represent differential RSRP as many as 64 dB) instead of a 4-bit value may be used to represent the differential RSRP. Take into consideration of the 1-bit to indicate whether the differential value is positive or negative, the differential RSRP may be represented by a total of 6-bit value. If the differential RSRP is still within 32 dB, the differential RSRP may be represented by a total of 5-bit value. The choice of 5-bit value or 6-bit value can be configured by RRC signaling.

In the first example, because the RSRP #0-1 is the largest value among all of the measured values based on the CSI-RS resources in the first Resource Setting linked to the 'CSI-ReportConfig', it is not predictable whether RSRP #0-1 is the largest value among all of the measured values based on the CSI-RS resources in both the first Resource Setting and the second Resource Setting linked to the 'CSI-ReportConfig'. Therefore, one bit of the representation of differential RSRP has to be used to represent the positive or negative differential value.

A second example of the CSI report according to the first embodiment is shown in Table 2.

and CRI #1-4) are selected from a different Resource Setting, i.e. the second Resource Setting.

On the other hand, when the CSI-RS resource or SSB resource indicated by CRI #0-1 is selected from the second Resource Setting linked to the 'CSI-ReportConfig', the CSI-RS resources indicated by CRI #(0-n) (n is an integer of 2 or more) (e.g. CRI #0-2, CRI #0-3, and CRI #0-4) are also selected from the same Resource Setting, i.e. the second Resource Setting. On the other hand, the CSI-RS resources indicated by CRI #(1-n) (n is an integer of 1 or more) (e.g. CRI #1-1, CRI #1-2, CRI #1-3, and CRI #1-4) are selected from a different Resource Setting, i.e. the first Resource Setting.

According to the second example, RSRP #0-1 is the maximum value among all of measured RSRPs (RSRP #0-1 to RSRP #0-4 and RSRP #1-1 to RSRP #1-4) based on the selected CSI-RS resources in both the first Resource Setting and the second Resource Setting linked to the 'CSI-ReportConfig'. So, all of RSRP #0-2 to RSRP #0-4 and RSRP #1-1 to RSRP #1-4 would be smaller than RSRP #0-1, i.e. all of differential RSRP #0-2 to differential RSRP #0-4 and differential RSRP #1-1 to differential RSRP #1-4 would be positive values. So, it is unnecessary to use one bit for indicating whether the differential value is positive or negative in the representation of differential RSRP. Therefore, instead of 5-bit or 6-bit value for representing differential RSRP according to the first example, 4-bit (to represent a maximum differential RSRP of 32 dB) or 5-bit (to represent a maximum differential RSRP of 64 dB) can be used for representing differential RSRP according to the second example. The choice of 4-bit value or 5-bit value can be configured by RRC signaling.

A third example of the CSI report according to the first embodiment is shown in Table 3.

TABLE 2

| | CSI | CSI-RS resource indicated by CRI #0-1 is selected from which Resource Setting | RSRP |
|---|---|---|---|
| 1st pair | CRI #0-1 | 'first Resource Setting' or 'second Resource Setting' | RSRP #0-1 |
| | CRI #1-1 | | Differential RSRP #1-1 |
| 2nd pair | CRI #0-2 | | Differential RSRP #0-2 |
| | CRI #1-2 | | Differential RSRP #1-2 |
| 3rd pair | CRI #0-3 | | Differential RSRP #0-3 |
| | CRI #1-3 | | Differential RSRP #1-3 |
| 4th pair | CRI #0-4 | | Differential RSRP #0-4 |
| | CRI #1-4 | | Differential RSRP #1-4 |

Table 2 differs from Table 1 in an extra one bit "CSI-RS resource indicated by CRI #0-1 is selected from which Resource Setting". This one bit indicates whether the CSI-RS resource indicated by CRI #0-1 is selected from the first Resource Setting or the second Resource Setting.

According to the second example, RSRP #0-1 is the largest value among all of the measured values based on the selected CSI-RS resources or SSB resources in both the first Resource Setting and the second Resource Setting linked to the 'CSI-ReportConfig'.

When the CSI-RS resource indicated by CRI #0-1 is selected from the first Resource Setting linked to the 'CSI-ReportConfig', the CSI-RS resources indicated by CRI #(0-n) (n is an integer of 2 or more) (e.g. CRI #0-2, CRI #0-3, and CRI #0-4) are also selected from the same Resource Setting, i.e. the first Resource Setting. On the other hand, the CSI-RS resources indicated by CRI #(1-n) (n is an integer of 1 or more) (e.g. CRI #1-1, CRI #1-2, CRI #1-3,

TABLE 3

| | CSI | RSRP |
|---|---|---|
| 1st pair | CRI #0-1 | RSRP #0-1 |
| | CRI #1-1 | Differential RSRP #1-1 |
| 2nd pair | CRI #0-2 | RSRP #0-2 |
| | CRI #1-2 | Differential RSRP #1-2 |
| 3rd pair | CRI #0-3 | RSRP #0-3 |
| | CRI #1-3 | Differential RSRP #1-3 |
| 4th pair | CRI #0-4 | RSRP #0-4 |
| | CRI #1-4 | Differential RSRP #1-4 |

Table 3 differs from Table 1 in that, in addition to RSRP #0-1, all of other RSRPs measured based on the CRI-RS resources in the same Resource Setting, i.e., the first Resource Setting, linked to the 'CSI-ReportConfig', are also reported with a 7-bit value. That is, all of RSRP #(0-n) (n is an integer of 1 or more) (e.g. RSRP #0-1, RSRP #0-2, RSRP #0-3, and RSRP #0-4) are represented by a 7-bit value.

On the other hand, all of RSRPs measured based on the selected CRI-RS resources in a different Resource Setting, i.e. the second Resource Setting, linked to the 'CSI-ReportConfig', are reported in a differential manner. That is, Differential RSRP #(1-n) (n is an integer of 1 or more) is a difference value of RSRP #(1-n) from RSRP #(0-n) (e.g. "Differential RSRP #(1-n)"=RSRP #(0-n)−RSRP #(1-n)). For example, Differential RSRP #1-1=RSRP #0-1−RSRP #1-1; Differential RSRP #1-2=RSRP #0-2−RSRP #1-2; Differential RSRP #1-3=RSRP #0-3−RSRP #1-3; and Differential RSRP #1-4=RSRP #0-4−RSRP #1-4. Each of "Differential RSRP #(1-n)" is represented a 5-bit value or a 6-bit value configured by RRC signaling.

Similar to the first example, "Differential RSRP #(1-n)" (n is a positive integer) may be a positive value or a negative value in the third example. Therefore, one bit of the representation of differential RSRP (i.e. one bit of the 5-bit value or 6-bit value), e.g. the most significant bit (MSB) of the differential RSRP, may be used to indicate whether the differential value is positive (e.g. by '0') or negative (e.g. by '1').

As a whole, according to the first embodiment, N pairs of CRIs are contained in a single CSI report. This is useful for single-DCI based multi-TRP PDSCH transmission. That is, the TCI states containing the RS corresponding to each reported CRI pair with QCL-TypeD can be activated for one TCI codepoint for non-coherent joint PDSCH transmission in FR2.

A second embodiment is related to multi-DCI based multi-TRP DL transmission.

The following conditions are met for the second embodiment: (1) the UE is configured with a CSI reporting setting 'CSI-ReportConfig' linked to two Resource Settings (e.g. first Resource Setting and second Resource Setting); (2) the higher layer parameter 'report Quantity' is set to 'cri-RSRP'; (3) the UE is configured with the higher layer parameter 'groupBasedBeamReporting' set to 'enabled'; and (4) A higher layer parameter nrofReportedRS-Rel-17 is configured to the UE. Under these conditions, a CSI report will be transmitted from the UE to the base station (e.g. gNB).

In the scenario of multi-DCI based multi-TRP DL transmission, in any slot, any TRP (TRP0 or TRP1) may transmit a DCI scheduling a PDSCH transmission transmitted by any TRP (TRP0 or TRP1). It means that in one slot, the UE may receive two DCIs transmitted by two TRPs and may receive two PDSCH transmissions simultaneously, each of which is transmitted by a separate TRP (TRP0 or TRP1). A higher layer parameter CORESETPoolIndex can be configured for each CORESET for TRP identification. The CSI-RS resources in the first Resource Setting are transmitted from one TRP (e.g. TRP0); and the CSI-RS resources in the second Resource Setting are transmitted from the other TRP (e.g. TRP1).

When the higher layer parameter 'report Quantity' is set to 'cri-RSRP', the UE should transmit a CSI report including CRI and the measured RSRP based on the CSI-RS resource indicated by the CRI. As the RSRP is measured based on the CSI-RS resource indicated by the CRI, we can say that the RSRP corresponds to the CRI. In particular, a measured RSRP is a received power of the CSI-RS resource.

In the scenario of multi-DCI based multi-TRP DL transmission, the CSI report includes two sets of CRIs. The first set of CRIs indicates CSI-RS resources selected from the CSI-RS resources in the first Resource Setting linked to the 'CSI-ReportConfig' transmitted from one TRP (e.g. TRP0). The second set of CRIs indicates CSI-RS resources selected from the CSI-RS resources in the second Resource Setting linked to the 'CSI-ReportConfig' transmitted from the other TRP (e.g. TRP1). The higher layer parameter nrofReportedRS-Rel-17 indicates the number of different CRIs in each of the two sets to be contained in the CSI report. A CSI-RS resource indicated by any CRI in the first set (i.e. one CSI-RS resource transmitted from one TRP (e.g. TRP0)) and another CSI-RS resource indicated by any CRI in the second set (i.e. one CSI-RS resource transmitted from the other TRP (e.g. TRP1)) can be received simultaneously by the UE either with a single spatial domain receive filter, or with multiple simultaneous spatial domain receive filters.

The higher layer parameter nrofReportedRS-Rel-17 can be set to N (N is a positive integer). If the higher layer parameter nrofReportedRS-Rel-17 is not configured, the N can be set as a default value, e.g. 1. The higher layer parameter nrofReportedRS-Rel-17 in the scenario of multi-DCI based multi-TRP DL transmission has a different meaning from that in the scenario of single-DCI based multi-TRP DL transmission. The UE measures the RSRP of each CSI-RS resource in the first Resource Setting transmitted from TRP0, and measures the RSRP of each CSI-RS resource in the second Resource Setting transmitted from TRP1. The UE selects N CSI-RS resources in the first Resource Setting linked to the 'CSI-ReportConfig' transmitted from TRP0 according to the values of RSRPs measured based on the CSI-RS resources, e.g. the maximum N measured RSRPs, and N CSI-RS resources in the second Resource Setting linked to the 'CSI-ReportConfig' transmitted from TRP1 according to the values of RSRPs measured based on the CSI-RS resources, e.g. the maximum N measured RSRPs, wherein any selected CSI-RS resource in the first Resource Setting transmitted from TRP0 can be received simultaneously with any selected CSI-RS resource in the second Resource Setting transmitted from TRP1. The selected N CSI-RS resources in the first Resource Setting transmitted from TRP0 are indicated by CRI #(0-n), n=1, 2, . . . , N; and the selected N CSI-RS resources in the second Resource Setting transmitted from TRP1 are indicated by CRI #(1-n), n=1, 2, . . . , N. Any CSI-RS resource indicated by CRI #(0-n) and any CSI-RS resource indicated by CRI #(1-n) can be received simultaneously by the UE. The $m^{th}$ reported CRI (m=1, 2, . . . , 2N) (i.e. each of CRI #(0-n) and CRI #(1-n), n=1, 2, . . . , N) has the value of CRI k, k=0, 1, . . . , K−1, where K is the total number of CSI-RS resources configured in the first Resource Setting (or the second Resource Setting) linked to the 'CSI-ReportConfig'. The first CRI k (k≥0) in each pair of CRIs indicates the configured $(k+1)^{th}$ entry of associated nzp-CSI-RS Resource in the corresponding nzp-CSI-RS-ResourceSet in the first Resource Setting for channel measurement linked to the 'CSI-ReportConfig', the second CRI k (k≥0) in each pair indicates the configured $(k+1)^{th}$ entry of associated nzp-CSI-RSResource in the corresponding nzp-CSI-RS-ResourceSet in the second Resource Setting for channel measurement linked to the 'CSI-ReportConfig'.

For ease of discussion, in the following example, the value of the higher layer parameter nrofReportedRS-Rel-17 is assumed to be 4 (i.e. N=4). Needless to say, the value of the higher layer parameter nrofReportedRS-Rel-17 can be set to other positive integers than 4.

A first example of the CSI report according to the second embodiment is shown in Table 4.

TABLE 4

|  | CSI | RSRP |
|---|---|---|
| 1st set | CRI #0-1 | RSRP #0-1 |
|  | CRI #0-2 | Differential RSRP #0-2 |
|  | CRI #0-3 | Differential RSRP #0-3 |
|  | CRI #0-4 | Differential RSRP #0-4 |
| 2nd set | CRI #1-1 | RSRP #1-1 |
|  | CRI #1-2 | Differential RSRP #1-2 |
|  | CRI #1-3 | Differential RSRP #1-3 |
|  | CRI #1-4 | Differential RSRP #1-4 |

As can be seen from Table 4, two sets of CRI each of which includes four (i.e. N=4) different CRIs and their RSRPs (or Differential RSRPs) are contained in the CSI report.

CRI #0-1, CRI #0-2, CRI #0-3 and CRI #0-4 belong to the 1st set; and CRI #1-1, CRI #1-2, CRI #1-3 and CRI #1-4 belong to the 2nd set. In short, CRIs #0-n belong to the 1st set; and CRIs #(1-n) belong to the 2nd set. The CSI-RS resource indicated by any of CRIs #0-n (e.g. CRI #0-1, CRI #0-2, CRI #0-3 and CRI #0-4) and the CSI-RS resource indicated by any of CRIs #1-n (e.g. CRI #1-1, CRI #1-2, CRI #1-3 and CRI #1-4) can be received simultaneously by the UE. For example, CSI-RS resources indicated by CRI #0-1 and CRI #1-4 can be received simultaneously, or CSI-RS resources indicated by CRI #0-2 and CRI #1-3 can be received simultaneously.

All of the CSI-RS resources indicated by the CRIs of the 1st set (e.g. CRI #0-1, CRI #0-2, CRI #0-3 and CRI #0-4) are selected from the first Resource Setting; and all of the CSI-RS resources indicated by the CRIs of the 2nd set (e.g. CRI #1-1, CRI #1-2, CRI #1-3 and CRI #1-4) are selected from the second Resource Setting.

Each RSRP is measured based on the CSI-RS resource indicated by the CRI. For example, RSRP #0-1 is measured based on the CSI-RS resource indicated by CRI #0-1.

The measured RSRPs can be reported by ways of differential L1-RSRP based reporting. In particular, RSRP is quantized to a 7-bit value in the range [−140, −44] dBm with 1 dB step size. Only RSRP #0-1 and RSRP #1-1 are represented by a 7-bit value. RSRP #0-1 is the maximum measured value among all of the measured values based on the CSI-RS resources in the first Resource Setting linked to the 'CSI-ReportConfig'. In the example of Table 4, RSRP #0-1 is larger than any of RSRP #0-2, RSRP #0-3, and RSRP #0-4. RSRP #1-1 is the maximum measured value among all of the measured values based on the CSI-RS resources in the second Resource Setting linked to the 'CSI-ReportConfig'. In the example of Table 4, RSRP #1-1 is larger than any of RSRP #1-2, RSRP #1-3, and RSRP #1-4.

The other RSRPs (e.g., RSRP #0-2 to RSRP #0-4 and RSRP #1-2 to RSRP #1-4) are reported in a differential manner. That is, "Differential RSRP #0-2", "Differential RSRP #0-3" and "Differential RSRP #0-4" and "Differential RSRP #1-2", "Differential RSRP #1-3" and "Differential RSRP #1-4" are contained in the CSI report. The "Differential RSRP #0-m" (m is between 2 and 4) is a difference value of RSRP #0-m from RSRP #0-1 (e.g. "Differential RSRP #0-m"=RSRP #0−1−RSRP #0-m). The "Differential RSRP #1-m" (m is between 2 and 4) is a difference value of RSRP #1-m from RSRP #1-1 (e.g. "Differential RSRP #1-m"=RSRP #1-1−RSRP #1-m). It is obvious that all of "Differential RSRP #m" are positive values. A differential RSRP according to the second embodiment can be represented by a 4-bit value or a 5-bit value configured by RRC signaling.

As a whole, according to the second embodiment, 2 sets of CRIs, each of which includes N CRIs are contained in a single CSI report. This is useful for multi-DCI based multi-TRP PDSCH transmission. That is, TCI-states containing the CSI-RS resources with QCL-TypeD with the NZP-CSI-RS resource ID indicated by the first set of CRIs (e.g. CRI #0-1 or CRI #0-2 or CRI #0-3 or CRI #0-4) can be activated for PDSCH for one TRP (e.g. TRP0, that is associated with CORESETPoolIndex=0) and the TCI states containing the CSI-RS resources with QCL-TypeD with the NZP-CSI-RS resource ID indicated by the second set of CRIs (e.g. CRI #1-1 or CRI #1-2 or CRI #1-3 or CRI #1-4) can be activated for PDSCH for the other TRP (e.g. TRP1, that is associated with CORESETPoolIndex=1). Any one TCI state activated for the TRP associated with CORESETPoolIndex=0 can be received simultaneously with any one TCI state activated for the TRP associated with CORESETPoolIndex=1.

Both the first embodiment and the second embodiment are described when the higher layer parameter 'report Quantity' is set to 'cri-RSRP'. The present invention also applies to the situation when the higher layer parameter 'report Quantity' is set to 'ssb-Index-RSRP'. When the higher layer parameter 'reportQuantity' is set to 'ssb-Index-RSRP', the UE is configured with a CSI reporting setting 'CSI-ReportConfig' linked to two Resource Settings (e.g. first Resource Setting and second Resource Setting), each of which has one or multiple SSB resource sets, where each SSB resource set has one or multiple SSB resources. The SSB resources are to be received by the UE, L1-RSRPs are to be measured based on the SSB resources. SSBRIs and their corresponding L1-RSRPs will be reported. That is, in each of Tables 1-4, "CRI" will be replaced by "SSBRI".

FIG. 1 is a schematic flow chart diagram illustrating an embodiment of a method 100 according to the present application. In some embodiments, the method 100 is performed by an apparatus, such as a remote unit. In certain embodiments, the method 100 may be performed by a processor executing program code, for example, a microcontroller, a microprocessor, a CPU, a GPU, an auxiliary processing unit, a FPGA, or the like.

The method 100 may include 102 receiving a CSI reporting setting linked to two Resource Settings for channel measurement for group based beam reporting, and 104 transmitting a CSI report corresponding to the CSI reporting setting, wherein the CSI report includes two or more CRIs or SSBRIs and their corresponding received powers.

Figure 2:
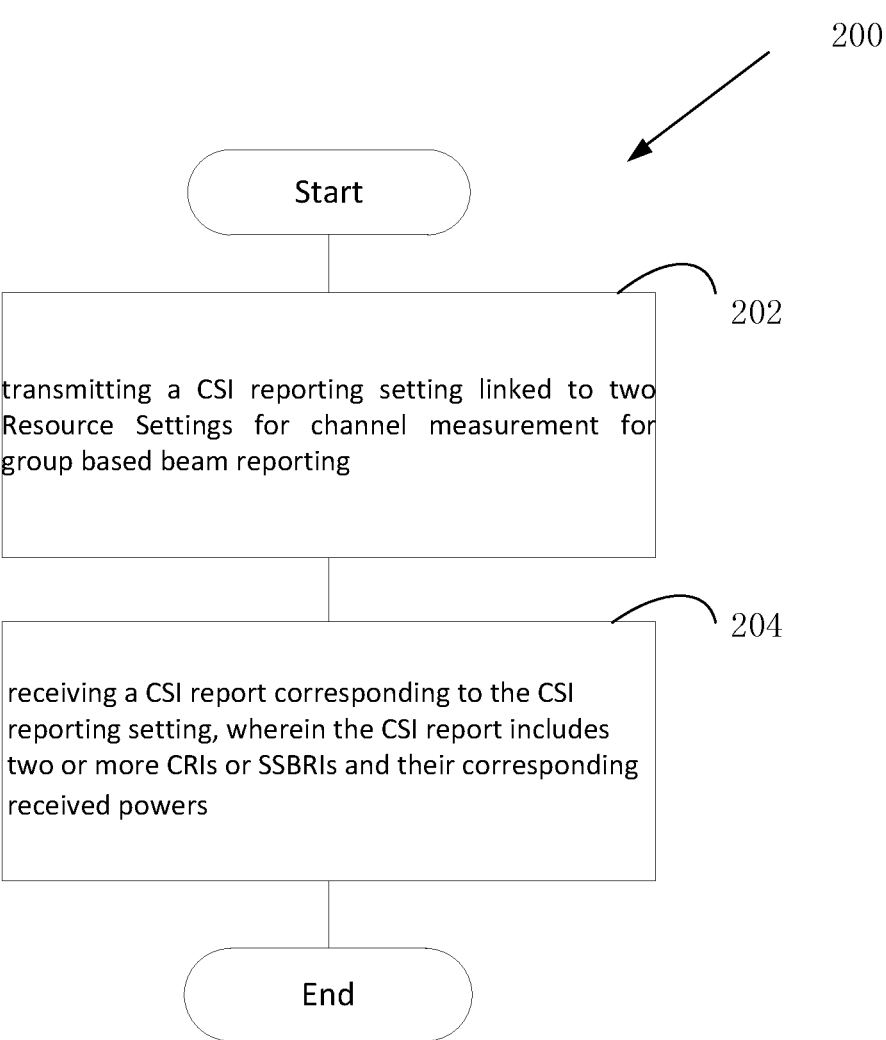
FIG. 2 is a schematic flow chart diagram illustrating a further embodiment of a method.

FIG. 2 is a schematic flow chart diagram illustrating an embodiment of a method 200 according to the present application. In some embodiments, the method 200 is performed by an apparatus, such as a base unit. In certain embodiments, the method 200 may be performed by a processor executing program code, for example, a microcontroller, a microprocessor, a CPU, a GPU, an auxiliary processing unit, a FPGA, or the like.

The method 200 may include 202 transmitting a CSI reporting setting linked to two Resource Settings for channel measurement for group based beam reporting, and 204 receiving a CSI report corresponding to the CSI reporting setting, wherein the CSI report includes two or more CRIs or SSBRIs and their corresponding received powers.

Figure 3:
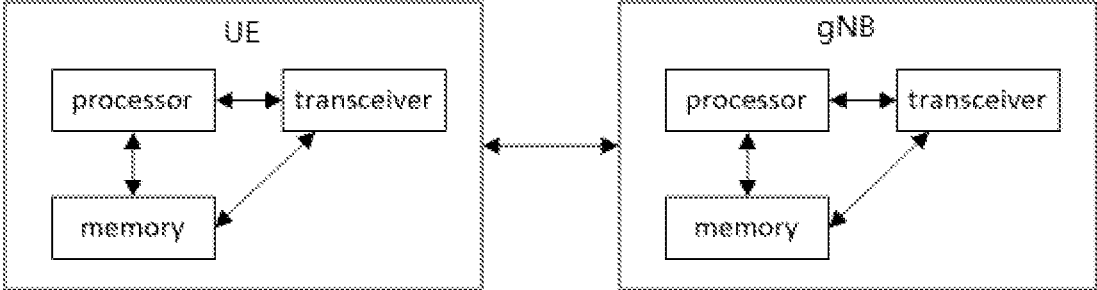
FIG. 3 is a schematic block diagram illustrating apparatuses according to one embodiment.

FIG. 3 is a schematic block diagram illustrating apparatuses according to one embodiment.

Referring to FIG. 3, the UE (i.e. the remote unit) includes a processor, a memory, and a transceiver. The processor implements a function, a process, and/or a method which are proposed in FIG. 1. The gNB (i.e. base unit) includes a processor, a memory, and a transceiver. The processors implement a function, a process, and/or a method which are proposed in FIG. 2. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

receiving a channel state information (CSI) report corresponding to a CSI reporting setting for a group based beam report, wherein the CSI report includes N pairs of two CSI-RS resource indicators (CRIs) or synchronization signal block (SSB) resource indicators (SSBRIs) and their corresponding received powers, N is configured by radio resource control (RRC) signaling and is a positive integer, and the CSI-RS or SSB resources indicated by CRIs or SSBRIs in each pair are received concurrently by a user equipment (UE));

wherein:

the received power with the largest value among received powers based on the CSI-RS or SSBRI resources in both a first Resource Setting and a second Resource Setting is included in the CSI report as RSRP, and the CSI report includes an extra one-bit indication indicating the RSRP is based on a CSI-RS or SSBRI resource in the first Resource Setting or in the second Resource Setting, and other received power(s) are included in the CSI report as differential RSRP(s).

2. A base station, comprising:

at least one memory; and at least one processor coupled with the at least one memory and configured to cause the base station to:

receive a channel state information (CSI) report corresponding to a CSI reporting setting for a group based beam report, wherein the CSI report includes N pairs of two CSI-RS resource indicators (CRIs) or synchronization signal block (SSB) resource indicators (SSBRIs) and their corresponding received powers, N is configured by radio resource control (RRC) signaling and is a positive integer, and the CSI-RS or SSB resources indicated by CRIs or SSBRIs in each pair are received concurrently by a user equipment (UE));

wherein:

the received power with the largest value among received powers based on the CSI-RS or SSBRI resources in both a first Resource Setting and a second Resource Setting is included in the CSI report as RSRP, and the CSI report includes an extra one-bit indication indicating the RSRP is based on a CSI-RS or SSBRI resource in the first Resource Setting or in the second Resource Setting, and other received power(s) are included in the CSI report as differential RSRP(s).

3. The base station of claim 2, wherein the CSI-RS or SSB resource indicated by one CRI or SSBRI in each pair is selected from a first Resource Setting, and the CSI-RS or SSB resource indicated by the other CRI or SSBRI in the each pair is selected from a second Resource Setting.

4. The base station of claim 3, wherein, the received power with the largest value among received powers based on the CSI-RS or SSBRI resources in the first Resource Setting is included in the CSI report as RSRP, and other received power(s) are included in the CSI report as differential RSRP(s), wherein one bit of representation of the differential RSRP indicates whether the differential RSRP is positive or negative.

5. The base station of claim 4, wherein the differential RSRP is represented by a 5-bit value or a 6-bit value configured by RRC signaling.

6. The base station of claim 3, wherein, all of the received powers based on the CSI-RS or SSBRI resources in the first Resource Setting are included in the CSI report as RSRPs, and all of the received powers based on the CSI-RS or SSBRI resources in the second Resource Setting are included in the CSI report as differential RSRPs, and one bit of representation of the differential RSRP indicates whether the differential RSRP is positive or negative.

7. The base station of claim 2, wherein the CSI report includes two sets of CRIs or SSBRIs and their corresponding received powers, each set includes N CRIs or SSBRIs and their corresponding received powers, Nis configured by RRC signaling and is a positive integer.

8. The base station of claim 7, wherein the CSI-RS or SSB resource indicated by each CRI or SSBRI in one set of the two sets is selected from a first Resource Setting, and the CSI-RS or SSB resource indicated by each CRI or SSBRI in the other set of the two sets is selected from a second Resource Setting.

9. The base station of claim 8, wherein the CSI-RS or SSB resource indicated by any CRI or SSBRI in the one set and the CSI-RS or SSB resource indicated by any CRI or SSBRI in the other set can be simultaneously received by UE.

10. The base station of claim 8, wherein, the received power with the largest value among received powers based on the CSI-RS or SSBRI resources in the one set, and the received power with the largest value among received powers based on the CSI-RS or SSBRI resources in the other set are included in the CSI report as RSRPs, and other received powers are included in the CSI report as differential RSRPs.

11. A user equipment (UE), comprising:

at least one memory; and at least one processor coupled with the at least one memory and configured to cause the UE to:

transmit a channel state information (CSI) report corresponding to a CSI reporting setting for a group based beam report, wherein the CSI report includes N pairs of two CSI-RS resource indicators (CRIs) or synchronization signal block (SSB) resource indicators (SSBRIs) and their corresponding received powers, N is configured by radio resource control (RRC) signaling and is a positive integer, and the CSI-RS or SSB resources indicated by CRIs or SSBRIs in each pair are received concurrently by the UE);

wherein:

the received power with the largest value among received powers based on the CSI-RS or SSBRI resources in both a first Resource Setting and a second Resource Setting is included in the CSI report as RSRP, and the CSI report includes an extra one-bit indication indicating the RSRP is based on a CSI-RS or SSBRI resource in the first Resource Setting or in the second Resource Setting, and other received power(s) are included in the CSI report as differential RSRP(s).

12. The UE of claim 11, wherein the CSI-RS or SSB resource indicated by one CRI or SSBRI in each pair is selected from a first Resource Setting, and the CSI-RS or SSB resource indicated by the other CRI or SSBRI in the each pair is selected from a second Resource Setting.

13. The UE of claim 12, wherein, the received power with the largest value among received powers based on the CSI-RS or SSBRI resources in the first Resource Setting is included in the CSI report as RSRP, and other received power(s) are included in the CSI report as differential RSRP(s), wherein one bit of representation of the differential RSRP indicates whether the differential RSRP is positive or negative.

14. The UE of claim 12, wherein, all of the received powers based on the CSI-RS or SSBRI resources in the first Resource Setting are included in the CSI report as RSRPs, and all of the received powers based on the CSI-RS or SSBRI resources in the second Resource Setting are included in the CSI report as differential RSRPs, and one bit of representation of the differential RSRP indicates whether the differential RSRP is positive or negative.

15. The UE of claim 11, wherein the CSI report includes two sets of CRIs or SSBRIs and their corresponding received powers, each set includes N CRIs or SSBRIs and their corresponding received powers, N is configured by RRC signaling and is a positive integer.

16. The UE of claim 15, wherein the CSI-RS or SSB resource indicated by each CRI or SSBRI in one set of the two sets is selected from a first Resource Setting, and the CSI-RS or SSB resource indicated by each CRI or SSBRI in the other set of the two sets is selected from a second Resource Setting.

17. The UE of claim 16, wherein the CSI-RS or SSB resource indicated by any CRI or SSBRI in the one set and the CSI-RS or SSB resource indicated by any CRI or SSBRI in the other set can be simultaneously received by UE.

18. The UE of claim 16, wherein, the received power with the largest value among received powers based on the CSI-RS or SSBRI resources in the one set, and the received power with the largest value among received powers based on the CSI-RS or SSBRI resources in the other set are included in the CSI report as RSRPs, and other received powers are included in the CSI report as differential RSRPs.

* * * * *